United States Patent [19]
Hess

[11] 3,954,306
[45] May 4, 1976

[54] LOAD RESPONSIVE BRAKE PRESSURE CONTROL VALVES

[75] Inventor: Wolfgang Hess, Ruebenach, Germany

[73] Assignee: Girling Limited, Birmingham, England

[22] Filed: June 26, 1974

[21] Appl. No.: 483,414

[30] Foreign Application Priority Data
June 26, 1973  United Kingdom............... 30332/73

[52] U.S. Cl................................ 303/22 R; 188/195
[51] Int. Cl.²........................................... B60T 8/18
[58] Field of Search.................. 303/22, 6 C, 24, 84; 188/195, 349

[56] References Cited
UNITED STATES PATENTS

| | | | |
|---|---|---|---|
| 3,169,800 | 2/1965 | Oberthür | 303/22 R UX |
| 3,191,999 | 6/1965 | Cordiano | 303/22 R |
| 3,449,018 | 6/1969 | Hales | 303/22 R X |
| 3,467,440 | 9/1969 | Strien | 188/349 X |
| 3,488,095 | 1/1970 | Rath | 303/22 R X |
| 3,563,612 | 2/1971 | Okamoto | 303/22 R |
| 3,684,329 | 8/1972 | Kawabe et al. | 303/22 R |
| 3,741,610 | 6/1973 | Holland | 303/6 C |

FOREIGN PATENTS OR APPLICATIONS
1,242,112   6/1967   Germany .......................... 303/22 A Primary Examiner—Duane A. Reger
Assistant Examiner—Douglas C. Butler
Attorney, Agent, or Firm—Scrivener Parker Scrivener and Clarke

[57] ABSTRACT

A brake pressure limiting or reducing valve has its cut-off or operating pressure determined in accordance with vehicle loading through the agency of a simple tension spring connected directly between a movable member of the valve and a portion of the vehicle which is subject to vertical movement, relative to the valve, in response to changes in the loading of the vehicle.

7 Claims, 5 Drawing Figures

LOAD RESPONSIVE BRAKE PRESSURE CONTROL VALVES

This invention relates to brake pressure control valves for use in hydraulic braking systems for vehicles, and more particularly to load conscious brake pressure limiting or reducing valves, i.e., valves inserted in the pressure line serving the brake or brakes on one axle of a vehicle which close to prevent any further increase in pressure on those brakes once a predetermined cut-off pressure has been attained, or to reduce the outlet pressure relative to the inlet pressure. This cut-off pressure is dependent upon the loading experienced by the axle in question, which is transmitted to the valve through a control linkage, which senses relative vertical movement between the sprung and the unsprung masses of the vehicle.

In the known arrangements of this general form of which we are presently aware, relatively complex and expensive constructions are employed for transmitting the load to the valve. For example, in one arrangement there is provided an adjustable linkage acting through a spring on the valve in a sense to resist closure of the valve, in opposition to the action of a spring mounted in the valve. The linkage has a transmission ratio of, say 1:25 in order to reduce the size of the valve and the strength of the internal spring, and in view of the substantial forces transmitted by the transmission, it is necessarily of a complex and expensive construction.

The present invention however, provides an hydraulic brake pressure control valve whose operation is controlled by a tension spring connected directly in use between a movable actuating member of the valve and a fixed point on one mass (say the unsprung mass) of a vehicle whereby to vary the operation of the valve in accordance with changes in the loading of the vehicle.

In the presently preferred form of the invention the spring is connected to an extension of the closure member of the valve and biasses the closure member to its open position.

More specifically the tension spring is connected to the valve closure member actuated by a differential piston, the spring acting to urge the valve closure member to its open position, and hydraulic pressure (when present) acting on the piston to urge the closure member to its closed position.

Some constructional forms of valve in accordance with the invention will now be described, by way of example, with reference to the accompanying drawings, in which.

Figure 1:
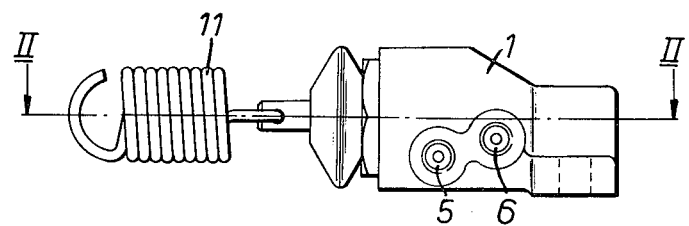
FIG. 1 is a plan view of one valve.
Figure 2:
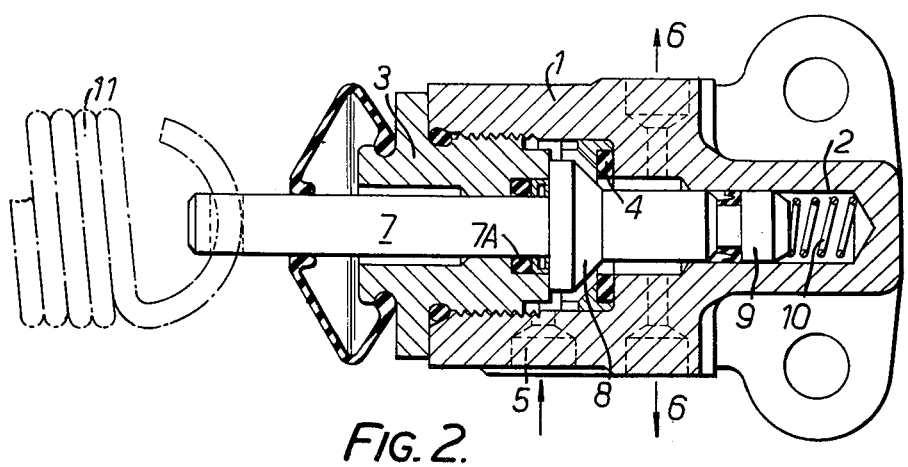
FIG. 2 is a section on the line II—II of FIG. 1 drawn to a larger scale.
Figure 3:
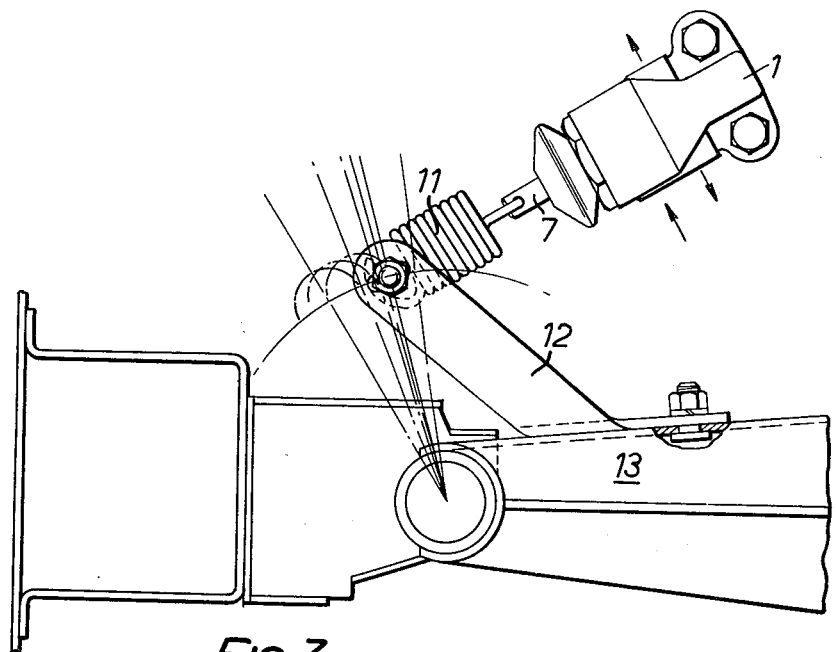
FIG. 3 is an elevation showing the valve of FIG. 1 in a typical installation.

The valve shown in FIGS. 1 to 3 comprises a housing 1 having a stepped bore, of which the inner portion comprises a cylinder bore 2 and the outer end is closed by a bush 3. A resilient valve seat 4 is supported in the stepped bore, between an inlet port 5 and a pair of outlet ports 6. The main operating member of the valve is constituted by a plunger having a stem 7 sealingly and slidingly extending through a seal 7A in the bush 3, a frusto-conical valve head 8, and an inner piston head 9 sealed in the cylinder bore 2. The sealed diameter of the piston head 9 is slightly larger than that of the stem 7, so that the plunger constitutes a differential area piston, which experiences a net hydraulic thrust to the right (inwardly) when pressure is applied to the valve inlet. A small internal spring 10 biasses the plunger outwardly.

The outwardly projecting portion of the stem 7 is apertured to provide anchorage for a tension spring 11, which in use is always under a slight pre-load. Thus the forces of springs 10 and 11 urge the plunger outwardly to the illustrated position, in which the valve head 8 abuts the inner end of the bush 3.

In use, when the brakes are applied, pressure rises in the inlet 5 and is freely transmitted through the open valve seat 4 to the outlets 6, until the pressure is sufficient to overcome the force of springs 10 and 11, whereupon the valve closes, by inward movement of the plunger closing the valve head 8 against the seat 4. Any further increase in pressure merely increases the closing force, and the outlet pressure is limited to that prevailing upon closure of the valve.

The operating, or cut-off, pressure of the valve will thus be seen to be determined by the differential area upon which the pressure acts and the resistance to closure offered by springs 10 and 11.

By virtue of the fact that the differential area is small, the pre-load in the spring 11 is correspondingly small, so that a relatively weak and inexpensive spring may be employed, compared with prior art arrangements.

Furthermore, the spring 11 can be connected directly between the valve, typically mounted on the sprung mass of the vehicle, and a convenient anchorage on the unsprung mass. Any tendency to overtravel of the plunger in the opening direction will be absorbed by further extension of the spring.

One possible installation is illustrated in FIG. 3, which shows the valve housing 1 mounted on the sprung mass, with the opposite of spring 11 anchored to an attachment member 12 fixedly secured to a swinging suspension arm 13, so that relative vertical movement between the unsprung mass, as measured at the arm 13, and the sprung mass varies the loading of spring 11, the loading being increased as the vehicle loading increases. Thus in the fully laden condition of the vehicle, the valve will close at a higher pressure than it would in the unladen condition.

The above described arrangements thus offer the advantages of a greatly simplified and cheaper control linkage without detracting from a reliable and sensitive operation of the valve.

Figure 4:
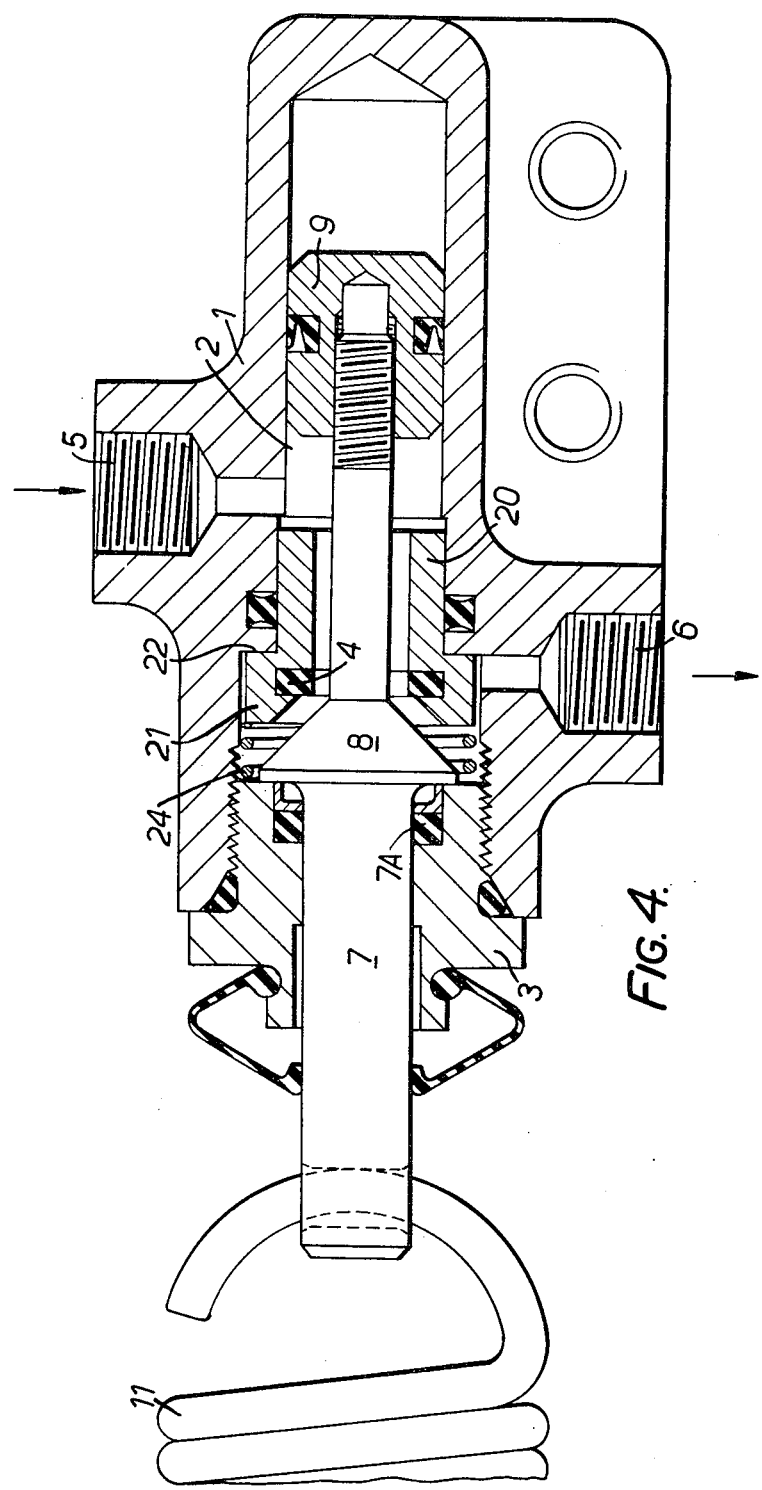
FIG. 4 is an axial section of a second form of valve.

The valve shown in FIG. 4 is generally similar in function and directed to that of FIGS. 1 to 3, but its internal construction is modified in accordance with our prior British Patent No. 1,215,806, to which attention is hereby directec.

In FIG. 4, the same reference numerals are used to identify parts corresponding to parts of the valve illustrated in FIGS. 1 to 3.

The main distinguishing feature of the valve of FIG. 4 is that the valve seat 4 is carried in an annular piston 20 working in the larger diameter portion of the stepped bore 2. The piston 20 has an enlarged head or flange 21 which normally abuts a shoulder 22, due to the action of a coil compression spring 24, the shoulder thus limiting movement of the annular piston towards the inlet 5. Similarly, movement of the piston head 9 towards the inlet under the control spring 11 is limited by abutment of the valve head 8 against the closure plug 3.

Operation of the valve is as described in the above mentioned complete specification. The valve 8, 4 is closed when the inlet pressure is sufficient to overcome the action of spring 11. Any further increase in pressure acts on the annular piston 20, over an effective differential area corresponding to the difference in outside diameters of the pistons 20 and 9, causing the parts 7, 20 and 9 to move outwardly, in unison, against the action of spring 24, thus transmitting a smaller pressure increase to the outlet 6, so that the valve operates as a pressure reducer after initial closure.

Other features of the valves described and claimed in the said specification British Patent No. 1,215,806 may also be incorporated, within the scope of the present invention.

Figure 5:
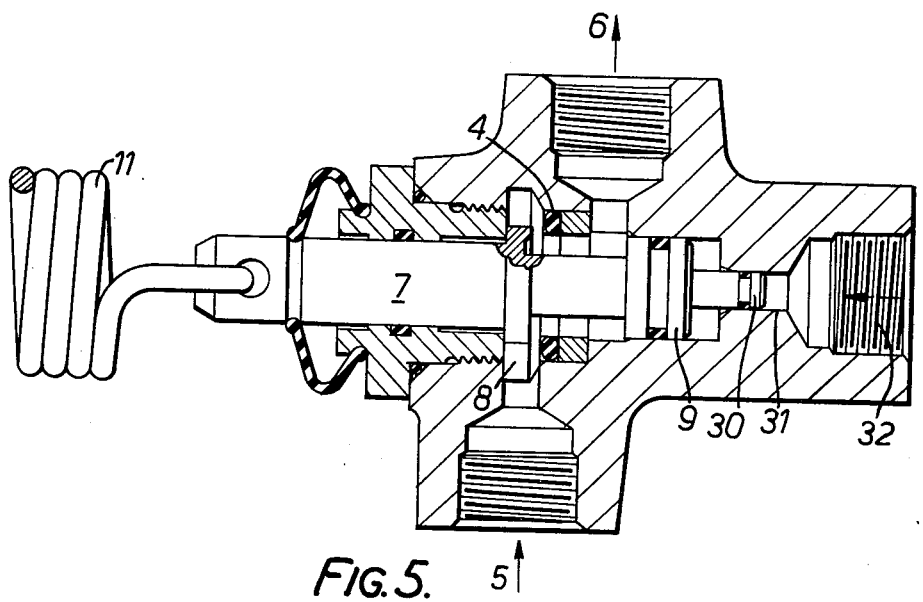
FIG. 5 is an axial section of a third form of valve.

The valve shown in FIG. 5 is generally similar to that of FIG. 2, except that an auxiliary piston 30 is provided as an extension of the plunger works in an auxiliary cylinder bore 31 connected by a port 32 to the front brake pressure line of the vehicle. Thus, the front line pressure, acting over the area of piston 30, assists the action of spring 11 in resisting closure of the valve, and thereby enables a lighter spring to be used. In the event of the spring 11 breaking, the piston 30 provides a residual biassing force tending to hold the valve open to assure a useful degree of rear wheel braking, and in the event of the front line pressure failing, the absence of hydraulic thrust assisting spring 11 will ensure that the valve will close at a relatively low pressure to reduce the risk of the rear wheels skidding.

I claim:

1. An hydraulic brake pressure control valve, comprising a housing having an inlet adapted to be connected to a source of pressure and an outlet, a movable valve member for controlling communication between said inlet and said outlet and a tension spring having one end connected directly to said valve member and having a second end adapted for direct connection to a vehicle part movable relative to another vehicle part on which said valve is mounted in use to vary the tension in said spring according to the loading of the vehicle said movable valve member being part of a differential piston member which is adapted to be urged in a valve closing direction by hydraulic pressure upon pressurization of the valve inlet, said tension spring applying to said valve member a force tending to hold said valve open.

2. A control valve as claimed in claim 1, comprising additional spring means located in said housing and acting on said valve member to assist the action of said tension spring.

3. A control valve according to claim 1, wherein said valve housing includes a further pressure inlet adapted for connection to a second source of fluid pressure and said valve member includes an auxiliary piston means responsive to pressure at said second inlet to assist the action of said tension spring.

4. A control valve as claimed in claim 1 wherein said valve member includes a sealed stem, a piston head and a valve head intermediate said sealed stem and said piston head for co-operation with a valve seat in said housing, said stem projecting externally of said housing and having said tension spring directly connected thereto.

5. A control valve as claimed in claim 4, including an annular piston member slidably sealed in said housing and carrying said valve seat, said annular piston being movable to transmit pressure increases from said inlet to said outlet at a reduced rate subsequent to closure of said valve head against said seat.

6. A control valve as claimed in claim 1 in combination with a vehicle having a sprung mass and an unsprung mass, said housing being mounted on one said mass and said tension spring having said second end directly attached to a point fixedly positioned on the other said mass.

7. An hydraulic brake pressure control valve as in claim 1 wherein said housing includes a pressure chamber and said differential piston member includes opposed differential fluid pressure areas exposed to the pressure in said pressure chamber, said differential areas being defined by cylindrical members of different cross-sectional areas forming parts of said piston member and extending in opposite directions outwardly of said pressure chamber, the outer end of each of said cylindrical members being exposed to atmospheric pressure.

* * * * *